R. B. LEWIS.
9771X
Hair Picker.
Patented June 25, 1836.
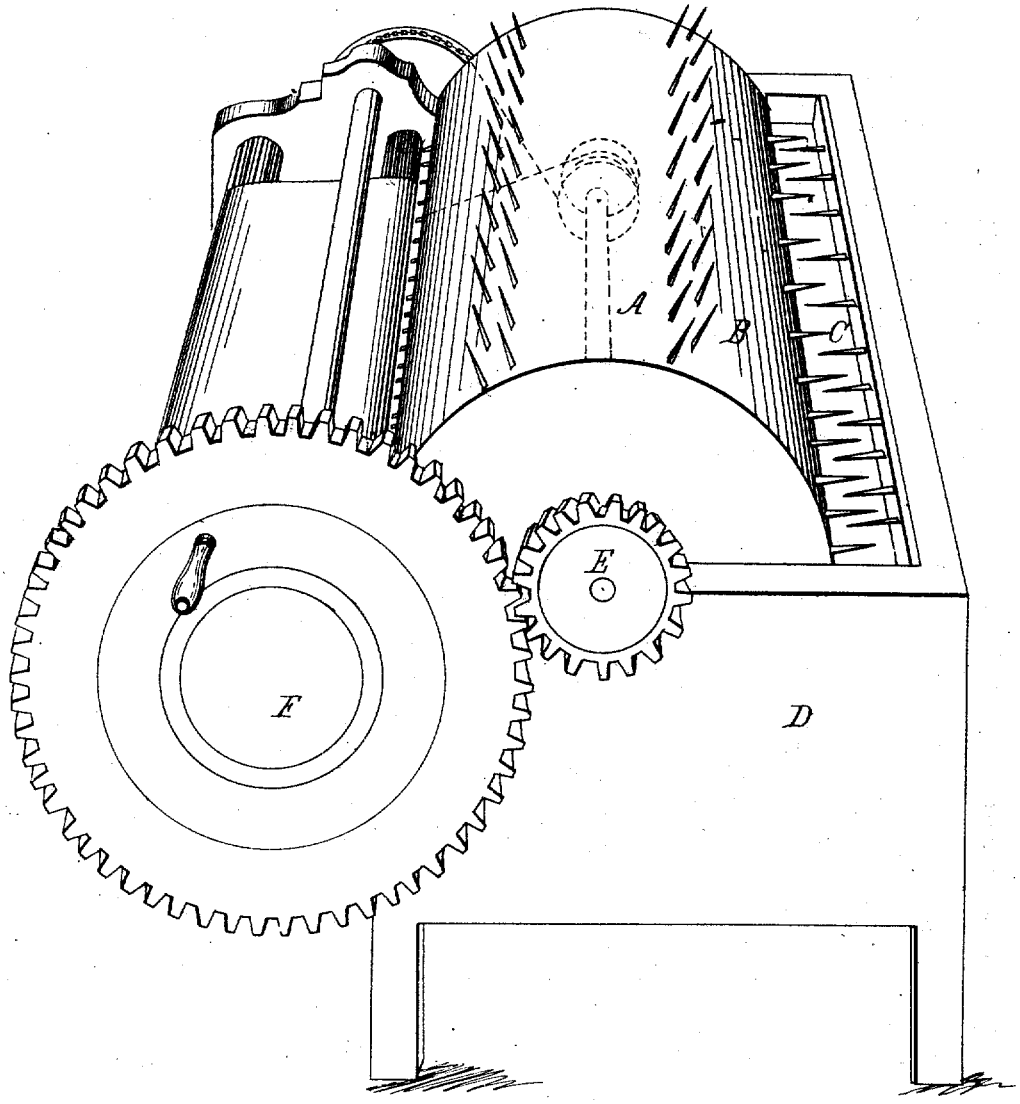
THE NORRIS PETERS CO., PHOTO-LITHO., WASHINGTON, D. C.

9771X

June 25, 1836

Robert Benjamin Lewis of Hallowell Maine

Letters Patent:

The schedule referred to in these Letters Patent and making part of the same Containing a description in the words of the said Robert Benjamin Lewis him self of his improvement in the machine for picking Oakum & Hair.

To all to whom these presents shall come,

Be it known that I Benjamin Robert Lewis of Hallowell in the County of Kennebec and State of Maine, have invented a new and useful machine for the picking of Oakum and hair called Robert Benjamin Lewis' Oakum and hair Mill, and that the following is a full and exact description thereof A, Cylinder playing in a box on its axis & turned by a wheel, the cylinder from two to four feet in diameter & the same in length, with eight double rows of smooth iron teeth running from one end of the cylinder to the other, said rows to be at equal distances - in said box and under the cylinder bars are placed made of wood or iron two by three inches and same length of the cylinder & from seven to fifteen in number and double rows of iron teeth set in each bar excepting the two upper or extreme bars which have a single row of teeth, all of said teeth to be two to three inches long & of the same diameter at the socket & running up to a point all of which bars placed together side by side form a semicircle under the cylinder.

A small pinion confined on the ~~end~~ of the bar, or axis, that runs through the cylinder and a large wheel confined to the frame or box which corresponds with the pinion and turns the cylinder round. —

The cylinder and bars are placed within the frame or box with three hundred to six hundred teeth so as to throw the Oakum or hair unencumbered on the back of the mill. A, the cylinder - B, the double rows of teeth on the cylinder - C, the bars with the teeth through which the teeth of the cylinder plays. D the box or frame in which the bars are placed & the cylinder runs to the pinion attached to the axis of the cylinder - F. the wheel attached to the box or frame which wheel corresponds with the pinion & turns the

9771X

June 25, 1836 cylinder. — In witness of the hereof, I said Robert have hereunto set my hand this 11th day of April A.D. 1836 —

Witness
John Anderson
John Pearson

Robert Benjamin Lewis 450 acs

Vs.
h.11.2450 acs

Drawing